(12) United States Patent
Efimov et al.

(10) Patent No.: US 10,845,550 B1
(45) Date of Patent: Nov. 24, 2020

(54) INPUT COUPLER FOR CHIP-SCALE LASER RECEIVER DEVICE

(71) Applicant: THE BOEING COMPANY, Chicago, IL (US)

(72) Inventors: Oleg M. Efimov, Thousand Oaks, CA (US); Biqin Huang, Torrance, CA (US); Pamela R. Patterson, Los Angeles, CA (US); Raymond Sarkissian, Studio City, CA (US); Keyvan Sayyah, Santa Monica, CA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/656,628

(22) Filed: Oct. 18, 2019

(51) Int. Cl.
| | |
|---|---|
| *G02B 6/42* | (2006.01) |
| *G02B 6/293* | (2006.01) |
| *H04B 10/50* | (2013.01) |
| *H04B 10/67* | (2013.01) |
| *H04J 14/02* | (2006.01) |
| *H04B 10/25* | (2013.01) |

(52) U.S. Cl.
CPC ......... *G02B 6/4215* (2013.01); *G02B 6/2938* (2013.01); *G02B 6/29343* (2013.01); *G02B 6/29395* (2013.01); *G02B 6/42* (2013.01); *G02B 6/4206* (2013.01); *H04B 10/25891* (2020.05); *H04B 10/503* (2013.01); *H04B 10/67* (2013.01); *H04J 14/02* (2013.01)

(58) Field of Classification Search
CPC .... G02B 6/4215; G02B 6/29395; G02B 6/42; G02B 6/29343; G02B 6/2938; G02B 6/4206; H04B 10/25891; H04B 10/503; H04B 10/67; H04J 14/02
See application file for complete search history.

(56) References Cited

U.S. PATENT DOCUMENTS

| | | | | |
|---|---|---|---|---|
| 5,078,516 A | * | 1/1992 | Kapon | G02B 6/1228 385/129 |
| 5,574,742 A | * | 11/1996 | Ben-Michael | G02B 6/1228 372/45.01 |
| 5,985,685 A | * | 11/1999 | Lealman | B82Y 20/00 372/45.01 |
| 6,240,233 B1 | * | 5/2001 | Weinert | G02B 6/305 385/131 |

(Continued)

*Primary Examiner* — Andrew Jordan
(74) *Attorney, Agent, or Firm* — Alston & Bird LLP (57) ABSTRACT

A laser receiver device and an associated input coupler are provided. In this regard, a chip-scale laser receiver device is provided that includes an input coupler that is configured to receive a gaussian beam. The input coupler includes a first waveguide having an optically-transparent material and a second waveguide coupled to the first waveguide. The second waveguide has a tapered configuration that tapers to a predetermined width across a length of not less than 500 micrometers. The input coupler further includes a third waveguide coupled to the second waveguide. The third waveguide has a tapered configuration that tapers to a predetermined width across a length of not less than 250 micrometers. The chip-scale laser receiver device further includes a bus optical waveguide coupled to receive a signal output from the input coupler, and to output a wavelength-multiplexed laser signal.

20 Claims, 4 Drawing Sheets

(56) References Cited

U.S. PATENT DOCUMENTS

| | | | | |
|---|---|---|---|---|
| 6,310,995 B1* | 10/2001 | Saini | B82Y 20/00 | 385/28 |
| 6,330,378 B1* | 12/2001 | Forrest | G02B 6/12002 | 372/50.21 |
| 6,381,380 B1* | 4/2002 | Forrest | B82Y 20/00 | 385/14 |
| 6,795,622 B2* | 9/2004 | Forrest | B82Y 20/00 | 372/6 |
| 6,819,814 B2* | 11/2004 | Forrest | B82Y 20/00 | 359/344 |
| 6,965,472 B2* | 11/2005 | Efimov | G02F 1/093 | 359/484.05 |
| 7,020,396 B2* | 3/2006 | Izadpanah | H01Q 3/2676 | 398/115 |
| 7,174,064 B2* | 2/2007 | Sayyah | H04B 10/25752 | 385/15 |
| 7,302,124 B2* | 11/2007 | Forrest | B82Y 20/00 | 385/14 |
| 7,333,689 B2* | 2/2008 | Menon | B82Y 20/00 | 385/131 |
| 7,437,033 B1* | 10/2008 | Efimov | G02B 6/34 | 359/341.3 |
| 7,643,710 B1* | 1/2010 | Liu | G02B 6/305 | 385/43 |
| 7,783,146 B2* | 8/2010 | Blauvelt | G02B 6/1228 | 385/50 |
| 7,983,562 B1* | 7/2011 | Yap | H04J 14/005 | 398/78 |
| 10,133,145 B2* | 11/2018 | Song | G02F 1/3133 | |
| 10,365,433 B2* | 7/2019 | Seyedi | G02B 6/29338 | |
| 10,502,900 B2* | 12/2019 | Seyedi | H01S 5/1071 | |
| 2002/0031297 A1* | 3/2002 | Forrest | B82Y 20/00 | 385/28 |
| 2002/0097941 A1* | 7/2002 | Forrest | H01S 5/0265 | 385/1 |
| 2003/0202794 A1* | 10/2003 | Izadpanah | H01Q 3/2676 | 398/115 |
| 2004/0037497 A1* | 2/2004 | Lee | G02B 6/1228 | 385/28 |
| 2004/0076394 A1* | 4/2004 | Carniel | G02B 6/125 | 385/129 |
| 2005/0157397 A1* | 7/2005 | Efimov | G02B 6/29362 | 359/629 |
| 2008/0095490 A1* | 4/2008 | Ashkenazi | G01H 9/004 | 385/13 |
| 2013/0336346 A1* | 12/2013 | Kobrinsky | H01S 5/0262 | 372/26 |
| 2014/0192363 A1* | 7/2014 | Kippenberg | G01J 3/42 | 356/451 |
| 2015/0163570 A1* | 6/2015 | Zid | H04J 14/028 | 398/45 |
| 2015/0168803 A1* | 6/2015 | Xu | H04Q 11/0005 | 359/332 |
| 2017/0090267 A1* | 3/2017 | O'Sullivan | G02F 1/225 | |
| 2017/0090268 A1* | 3/2017 | O'Sullivan | G02F 1/3132 | |
| 2017/0371226 A1* | 12/2017 | Song | G02F 1/3133 | |
| 2018/0267386 A1* | 9/2018 | Rios | G02F 1/313 | |
| 2019/0018112 A1* | 1/2019 | Sayyah | G01S 7/4972 | |
| 2019/0018113 A1* | 1/2019 | Sayyah | B81B 7/02 | |
| 2019/0018114 A1* | 1/2019 | Patterson | G01S 7/491 | |
| 2019/0018121 A1* | 1/2019 | Sayyah | G01S 7/499 | |
| 2019/0018198 A1* | 1/2019 | Sayyah | G01S 7/4913 | |
| 2019/0215089 A1* | 7/2019 | Huang | H04J 14/021 | |
| 2019/0235163 A1* | 8/2019 | Patterson | G02B 6/122 | |
| 2020/0021384 A1* | 1/2020 | Stojanovic | H04B 10/5059 | |
| 2020/0081202 A1* | 3/2020 | Thompson | G02B 6/305 | |
| 2020/0088845 A1* | 3/2020 | Talty | G01S 17/34 | |
| 2020/0088884 A1* | 3/2020 | Sayyah | G01S 17/34 | |
| 2020/0204284 A1* | 6/2020 | Huang | H04J 14/021 | |

\* cited by examiner

INPUT COUPLER FOR CHIP-SCALE LASER RECEIVER DEVICE

TECHNOLOGICAL FIELD

An example embodiment relates generally to a laser receiver device and, more particularly, to a chip-scale laser receiver device configured to mitigate the loss of light coupling to a receiver due to beam jitter.

BACKGROUND

In communication applications, a signal is transmitted by a transmitter to a receiver, such as from a laser transmitter to a laser receiver in conjunction with laser communications. For efficient and effective communications, the receiver is configured to receive the greatest percentage of the optical signals with the minimum loss.

A laser receiver device may include a mechanical nutator, fiber-optic based wavelength-division-multiplexed (WDM) components and discrete photodetectors. The mechanical nutator receives the laser communication signals and transmits those signals to the fiber-optic based WDM components. The laser communication signals generally include signals at each of a plurality of different wavelengths. Thus, the fiber-optic based WDM components are configured to separate the wavelength-multiplexed laser communication signals into individual wavelength channels. The wavelength-demultiplexed laser communication signals are then transmitted to and detected by corresponding discrete photodetectors.

In order to avoid undesired loss with respect to the laser communication signals coupling to the laser receiver, the mechanical nutator is configured to mitigate the loss of light coupling to the laser receiver due to beam jitter. However, mechanical nutators in combination with fiber-optic based WDM components and discrete photodetectors undesirably increase the size and weight of the laser receiver. Moreover, a laser receiver that includes a mechanical nutator, fiber-optic based WDM components and discrete photodetectors may also consume an appreciable amount of power. Particularly in instances in which the laser receiver is to be onboard a platform that is to be launched, the size and weight requirements, as well as the power consumption of the laser receiver including the mechanical nutator, the fiber-optic based WDM components and the discrete photodetectors may complicate the design and operation of the platform.

BRIEF SUMMARY

A laser receiver device and an associated input coupler are provided in accordance with an example embodiment. The laser receiver device of an example embodiment includes an input coupler as well as WDM tunable optical filters and photodetectors that are smaller in size and weight and that consume less power than conventional laser receiver devices that include a mechanical nutator, fiber-optic based WDM components and discrete photodetectors. Thus, the laser receiver device of an example embodiment correspondingly reduces the size, weight and power requirements of a platform that carries the laser receiver device including, for example, a platform configured to launched or otherwise configured to be airborne or spaceborne. However, the input coupler of the laser receiver device of an example embodiment is configured to mitigate the loss of light coupling to the laser receiver device due to beam jitter, thereby increasing the efficiency with which the laser receiver device operates even though the laser receiver device is smaller, lighter and consumes less power.

In example embodiment, a chip-scale laser receiver device is provided that includes an input coupler that is configured to receive a gaussian beam. The input coupler includes a first waveguide having an optically-transparent material and a second waveguide coupled to the first waveguide. The second waveguide has a tapered configuration that tapers to a predetermined width across a length of not less than 500 micrometers. The input coupler further includes a third waveguide coupled to the second waveguide. The third waveguide has a tapered configuration that tapers to a predetermined width across a length of not less than 250 micrometers. The chip-scale laser receiver device further includes a bus optical waveguide coupled to receive a signal output from the input coupler, and to output a wavelength-multiplexed laser signal.

The laser receiver device of an example embodiment also includes a plurality of tunable micro-resonator based optical filters. Each tunable micro-resonator based optical filter is coupled to the bus optical waveguide and configured to de-multiplex the wavelength-multiplexed laser signal into multiple individual optical channels. The laser receiver device of this example embodiment further includes one or more photodiodes respectively coupled to the individual optical channels that are output from the plurality of micro-resonator based optical filters. Each photodiode is configured to detect a signal level of a respective individual optical channel.

The second waveguide of an example embodiment has a tapered configuration that tapers to a predetermined width of not more than 375 nanometers across a length of between 500 micrometers and 1000 micrometers, such as by tapering to the predetermined width across a length that is between 500 micrometers and 1000 micrometers based on the material of the second waveguide. In this example embodiment, the length is an amount at which the efficiency of the evanescent coupling of the first, second and third waveguides is at least 90 percent. The second waveguide of this example embodiment may be a Silicon OxyNitride based tapered waveguide that tapers to a predetermined width of not more than 250 nanometers across a length of at least 730 micrometers.

The third waveguide of an example embodiment has a tapered configuration that tapers to a predetermined width of not more than 120 nanometers across a length of between 250 micrometers and 500 micrometers. In this example embodiment, the third waveguide may taper to the predetermined width across a length that is between 250 micrometers and 500 micrometers based on the material of the third waveguide. In this example embodiment, the length is an amount at which the efficiency of the evanescent coupling of the first, second and third waveguides is at least 90 percent. The third waveguide of this example embodiment may be a Silicon On Insulator based tapered insulator waveguide that tapers to the predetermined width of not more than 80 nanometers across a length of at least 350 micrometers.

In another example embodiment, a chip-scale laser receiver device is provided that includes an input coupler that is configured to receive a gaussian beam. The input coupler includes a first waveguide having an optically-transparent material and a second waveguide coupled to the first waveguide. The second waveguide has a tapered configuration that tapers to a predetermined width across a length of not less than 500 micrometers. The input coupler also includes a third waveguide coupled to the second waveguide. The third waveguide has a tapered configuration that tapers to a predetermined width across a length of not less than 250 micrometers. The chip-scale laser receiver device also includes a plurality of tunable micro-resonator based optical filters, each of which is configured to demultiplex a wavelength-multiplexed laser signal into multiple individual optical channels. The chip-scale laser receiver device further includes one or more photodiodes respectively coupled to the individual optical channels that are output from the plurality of micro-resonator based optical filters. Each photodiode is configured to detect a signal level of a respective individual optical channel.

The laser receiver device of an example embodiment also includes a bus optical waveguide coupled to receive a signal output from the input coupler, and configured to output the wavelength-multiplexed laser signal to the plurality of tunable micro-resonator based optical filters. The second waveguide of this example embodiment tapers to the predetermined width across a length that is between 500 micrometers and 1000 micrometers based on the material of the second waveguide. In this regard, the length may be an amount at which the efficiency of the evanescent coupling of the first, second and third waveguides is at least 90 percent. The second waveguide may be a Silicon OxyNitride based tapered waveguide that tapers to a predetermined width of not more than 250 nanometers across a length of at least 730 micrometers. The third waveguide of an example embodiment is a Silicon On Insulator based tapered insulator waveguide that tapers to the predetermined width of not more than 80 nanometers across a length of at least 350 micrometers.

In a further example embodiment, an input coupler of a chip-scale laser receiver device is provided that includes a first waveguide having an optically-transparent material and a second waveguide coupled to the first waveguide. The second waveguide has a tapered configuration that tapers to a predetermined width across a length of not less than 500 micrometers. The input coupler further includes a third waveguide coupled to the second waveguide. The third waveguide has a tapered configuration that tapers to a predetermined width across a length of not less than 250 micrometers.

The second waveguide of an example embodiment has a tapered configuration that tapers to a predetermined width of not more than 375 nanometers across a length of between 500 micrometers and 1000 micrometers, such as by tapering to the predetermined width across a length that is between 500 micrometers and 1000 micrometers based on the material of the second waveguide. In this example embodiment, the length is an amount at which the efficiency of the evanescent coupling of the first, second and third waveguides is at least 90 percent. The second waveguide of this example embodiment may be a Silicon OxyNitride based tapered waveguide that tapers to a predetermined width of not more than 250 nanometers across a length of at least 730 micrometers. The third waveguide of an example embodiment has a tapered configuration that tapers to a predetermined width of not more than 120 nanometers across a length of between 250 micrometers and 500 micrometers, such as by tapering to the predetermined width across a length that is between 250 micrometers and 500 micrometers based on the material of the third waveguide. In this example embodiment, the length may be an amount at which the efficiency of the evanescent coupling of the first, second and third waveguides is at least 90 percent. The third waveguide of this example embodiment may be a Silicon On Insulator based tapered insulator waveguide that tapers to the predetermined width of not more than 80 nanometers across a length of at least 350 micrometers.

BRIEF DESCRIPTION OF THE FIGURES

Having described certain example embodiments of the present disclosure in general terms above, reference will now be made to the accompanying drawings, which are not necessarily drawn to scale and wherein.

DETAILED DESCRIPTION

Some embodiments of the present disclosure will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, the terms "data," "content," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure.

Figure 1:
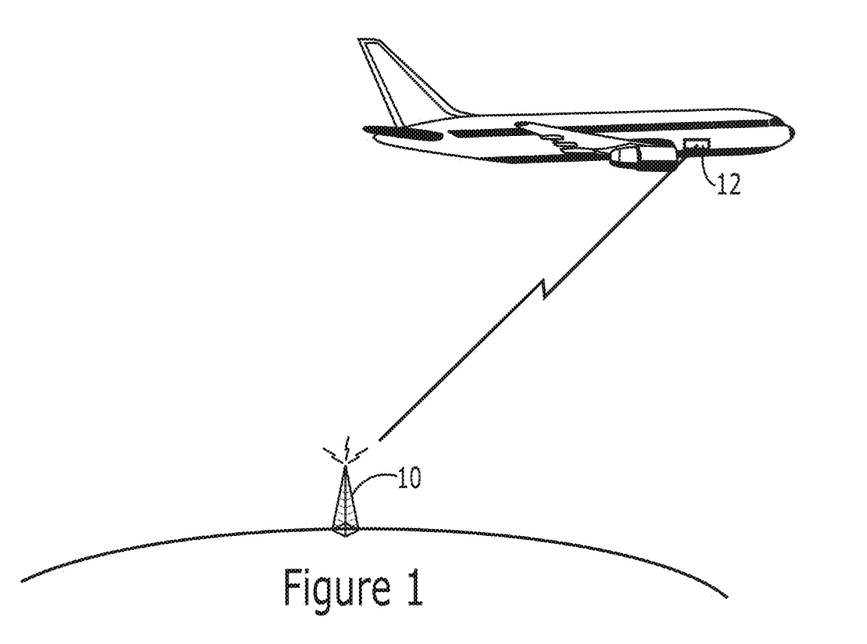
FIG. 1 is a schematic representation of a laser communication system.

Laser and other optical communications are conducted between a transmitter and one or more receivers. As shown in FIG. 1, for example, laser communications may be conducted between a transmitter 10, such as a laser, and a laser receiver device 12 that is onboard an air vehicle 14, such as an airplane, a drone or the like, a space vehicle, such as a spacecraft or the like, or any of a wide variety of other vehicles or platforms. Moreover, while the transmitter of FIG. 1 is depicted to be land borne and fixed in position, the transmitter of another example embodiment may also be onboard a platform that is in motion, such as a terrestrial platform or a platform that is airborne.

In order to effectively communicate, the laser receiver device 12 advantageously receives a substantial percentage of the signals that are transmitted by the transmitter 10 and that are incident upon the laser receiver device. However, jitter of the laser communications signals, such as due to movement of the laser receiver device 12, movement of other components of the laser communications system and/ or atmospheric disturbances may create jitter of the signals. As such, the laser receiver device 12 is advantageously configured to accommodate jitter while still efficiently receiving the laser communication signals.

The laser receiver device 12 of an example embodiment is a chip-scale device and, as such, has a much smaller size and weight than laser receiver devices that include a mechanical nutator, fiber-optic based WDM components and discrete photodetectors. Moreover, the chip-scale construction of the laser receiver device 12 permits the power requirements of the laser receiver device of an example embodiment to be correspondingly reduced relative to laser receiver devices that include a mechanical nutator, fiber-optic based WDM components and discrete photodetectors. As such, the laser receiver device 12 may be utilized on a variety of platforms including platforms that are launched into air or space by correspondingly reducing the size, weight and power requirements of these platforms relative to platforms that carry laser receiver devices having a mechanical nutator, fiber-optic based WDM components and discrete photodetectors.

Figure 2:
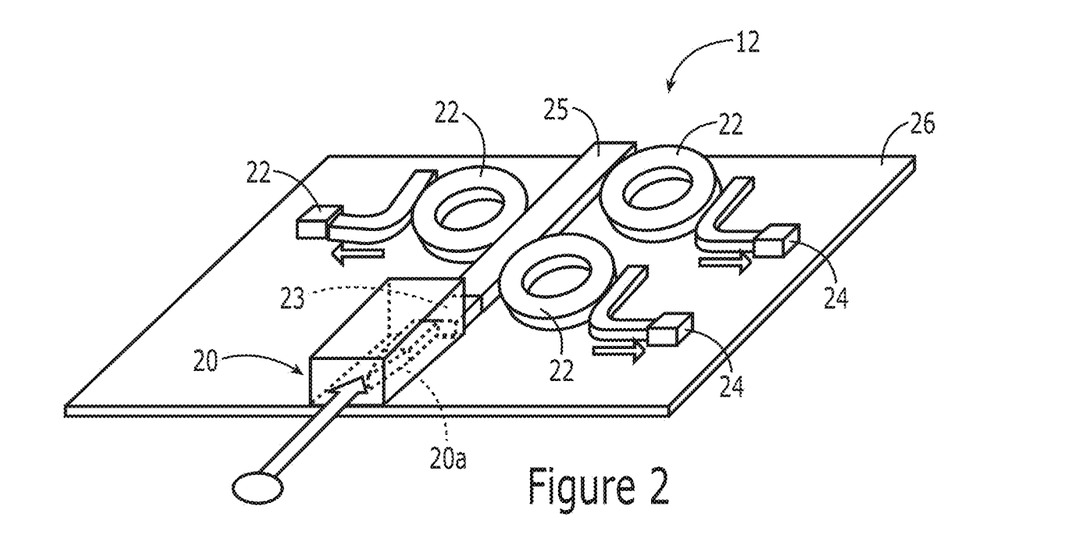
FIG. 2 is a schematic perspective view of a laser receiver device in accordance with an example embodiment.

An example embodiment of a chip-scale laser receiver device 12 is depicted in FIG. 2. As shown, the laser receiver device 12 includes an input coupler 20, a plurality of waveguide-based tunable micro-resonator based optical filters 22, such as a plurality of waveguide based chip-scale tunable micro-ring resonator optical filters, and a plurality of integrated waveguide coupled photodetectors 24. As such, the laser receiver device 12 receives the optical communication signals via the input coupler 20, de-multiplexes the optical communication signals with the waveguide-based tunable micro-resonator based optical filters 22 into multiple optical channels with different center frequencies and detects the optical signals of the different optical channels with respective photodetectors 24. Although the embodiment of FIG. 2 includes three waveguide-based tunable micro-resonator based optical filters 22 and correspondingly three photodetectors 24, the laser receiver device 12 may include any number of waveguide-based tunable micro-resonator based optical filters and photodetectors. For example, the input coupler 20 may be coupled to the waveguide-based tunable micro-resonator based optical filters 22 by a bus 25, which may be configured to extend to additional waveguide-based tunable micro-resonator based optical filters and photodetectors in other embodiments. As also depicted in the embodiment of FIG. 2, the laser receiver device 12 may optionally include a semiconductor optical amplifier (SOA) 23 positioned between the input coupler 20 and the waveguide-based tunable micro-resonator based optical filters 22 in order to amplify the signals prior to propagation through the waveguide-based tunable micro-resonator based optical filters. As shown in FIG. 2, the components of the laser receiver device 12 including the input coupler 20, the plurality of waveguide-based tunable micro-resonator based optical filters 22 and the plurality of integrated waveguide coupled photodetectors 24 are carried by a substrate 26, such as a silicon (Si) substrate.

The input coupler 20 of an example embodiment includes three intertwined dielectric waveguides, namely, a first waveguide 30, a second waveguide 32 and a third waveguide 34. As described below, the three dielectric waveguides may include a first polymer-based waveguide 30, a second Silicon OxyNitride (SiON)-based waveguide 32, and a third silicon (Si)-based waveguide 34. An end view of the end face of the input coupler 20, such as the end face of the first waveguide 30, is depicted is FIG. 3. In an example embodiment, the first waveguide 30 is a polymer-based ridge waveguide, such as a polyimide ridge waveguide. As a result of the ridged nature of the first waveguide 30, the first waveguide has a step 30a proximate the substrate 26 and a ridged waveguide 30b extending upwardly from the step. Although the first waveguide 30 may have a variety of different shapes and sizes, the first waveguide of an example embodiment has a step 30a with a step height of two micrometers and a ridged waveguide 30b having a height of six micrometers and a width of 13 micrometers.

Figure 4:
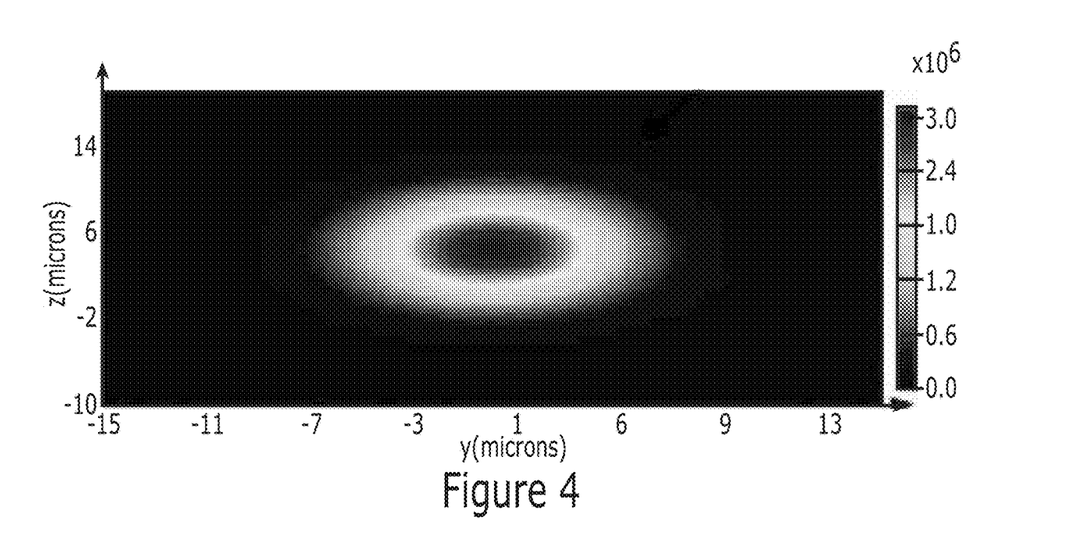
FIG. 4 is a graphical representation of a Gaussian input beam having a ten micrometer diameter centered at 4.4 micrometers from the interface between the Silicon OxyNitride and the underlying substrate.

The first waveguide 30 is configured to receive the optical communication signals, such as from the laser transmitter 10 or one or more intermediate transmission elements. In an example embodiment, the optical communication signals are comprised of a Gaussian beam transmitted by the laser transmitter 10. An example of a Gaussian beam having a ten micrometer diameter upon incidence with the end face of the input coupler 30 at a predefined excitation point 36 located 4.4 micrometers from the substrate 26 and centered widthwise within the first waveguide 30 is illustrated in FIG. 4. In this example embodiment in which the Gaussian beam has a ten micrometer diameter, the first waveguide 30 may efficiently couple the Gaussian beam, even in instances in which the Gaussian beam has a jitter up to +/−1.5 micrometer from the predefined excitation point 36, thereby providing a +/−1.5 micrometer beam jitter tolerance.

Figure 5:
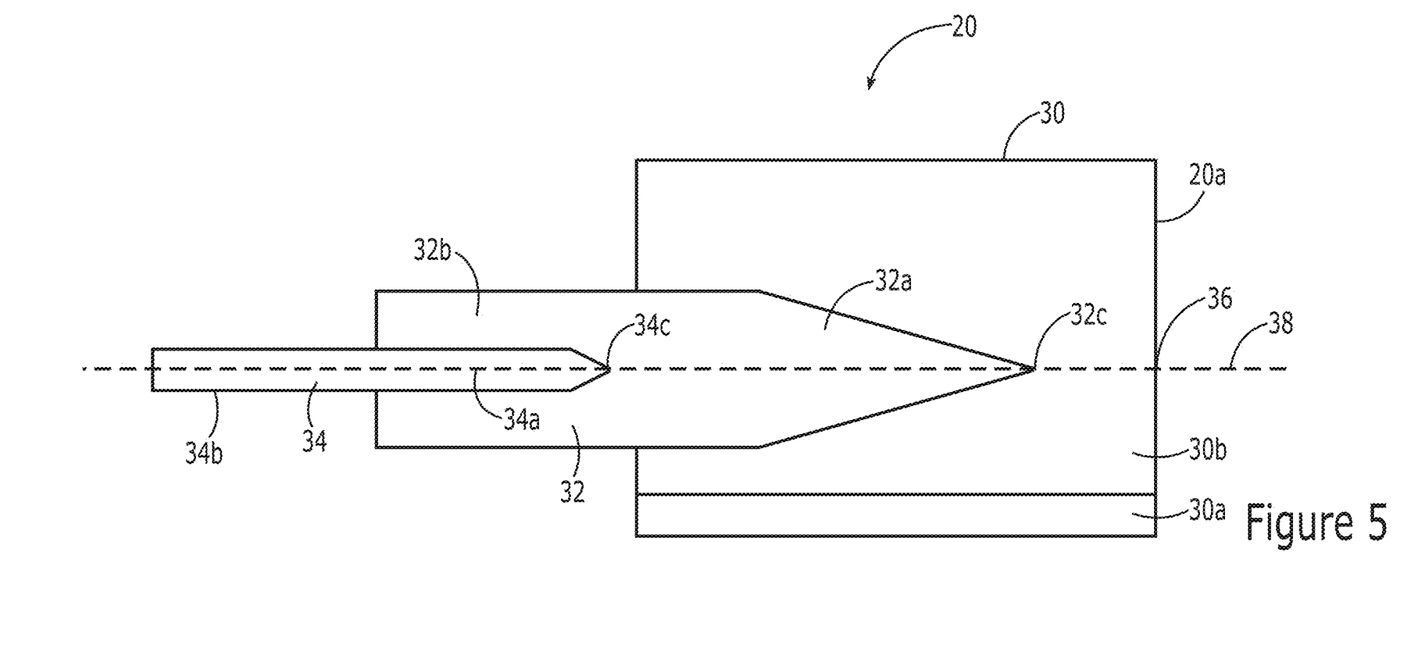
FIG. 5 is a side view of an input coupler in accordance with an example embodiment.

As shown in FIG. 5, a side view of the input coupler 30 depicts the first, second and third waveguides 30, 32, 34, each of which extends longitudinally along a longitudinal axis 38. As also shown in FIG. 5, the second waveguide 32 extends longitudinally into the first waveguide 30 and the third waveguide 34 extends longitudinally into the second waveguide. The second waveguide 32 of the illustrated embodiment includes a first region 32a that is tapered in lateral cross-sectional dimensions (in a plane perpendicular to the longitudinal axis 38), such as by having a radius that is tapered in an embodiment in which the second waveguide has a circular cross-sectional shape or by having a width and a height that are tapered in an embodiment in which the second waveguide has a rectangular cross-sectional shape. As shown, the second waveguide 32 tapers such that the size of the first region 32a gradually becomes smaller in a longitudinal direction extending from a medial portion of the second waveguide into the first waveguide 30 to an end 32c of the second waveguide that is disposed within the first waveguide. In an example embodiment, the end 32c of the second waveguide 32 is aligned along the longitudinal axis 38 that also extends through the predefined excitation point 36. The second waveguide 32 also includes a second region 32b that extends longitudinally beyond the first waveguide 30 and that has lateral cross-sectional dimensions that remain constant, such as by having a radius that is constant in an embodiment in which the second waveguide has a circular cross-sectional shape or by having a width and a height that are constant in an embodiment in which the second waveguide has a rectangular cross-sectional shape. In an embodiment in which the second waveguide 32 has a circular cross-sectional shape, the first region 32a may have a conical shape and the second region 32b may have a cylindrical shape.

The third waveguide 34 of the illustrated embodiment also a first region 34a that is tapered in lateral cross-sectional dimensions, such as by having a radius that is tapered in an embodiment in which the third waveguide has a circular cross-sectional shape or by having a width and a height that are tapered in an embodiment in which the third waveguide has a rectangular cross-sectional shape. As shown, the third waveguide 34 tapers such that the size of the first region 34a gradually becomes smaller in a longitudinal direction extending from a medial portion of the third waveguide into the second waveguide 32 to an end 34c of the third waveguide that is disposed within the second waveguide, but outside of the first waveguide 30. In an example embodiment, the end 34c of the third waveguide 32 is aligned along the longitudinal axis 38 that also extends through the end 32c of the second waveguide and the predefined excitation point 36. The third waveguide 34 also includes a second region 34b that extends longitudinally beyond the second waveguide 32 and that has lateral cross-sectional dimensions that remain constant, such as by having a radius that is constant in an embodiment in which the third waveguide has a circular cross-sectional shape or by having a width and a height that are constant in an embodiment in which the third waveguide has a rectangular cross-sectional shape. In an embodiment in which the third waveguide 34 has a circular cross-sectional shape, the first region 34a may have a conical shape and the second region 34b may have a cylindrical shape.

As a result of the tapered design, the mode of the first waveguide 30 is evanescently coupled to the second waveguide 32. Although the length and size of the tapered first regions 32a, 34a of the second and third waveguides 32, 34 may be modified in various embodiments, the second waveguide of an example embodiment tapers from the end 32c to a predetermined width across a length of not less than 500 micrometers, as measured along the longitudinal axis 38. In a more particular example embodiment, the tapered first region 32a of the second waveguide 32 tapers from the end 32c to a predetermined width of not more than 375 nanometers across a length of between 500 micrometers and 1000 micrometers, as measured along the longitudinal axis 38. In this regard, the second waveguide 32 of an example embodiment tapers from the end 32c to the predetermined width across a length of between 500 micrometers and 1000 micrometers as measured along the longitudinal axis 38 based on the material from which the second waveguide is formed. Although the second waveguide 32 may be formed of various materials, the second waveguide of an example embodiment is formed of a Silicon OxyNitride (SiON). Based on the formation of the second waveguide 32 from a SiON-based material, the second waveguide of an example embodiment tapers from the end 32c to a predetermined width of not more than 250 nanometers across a length of at least 730 micrometers, as measured along the longitudinal axis 38.

Although the third waveguide 34 may be formed of various materials, the third waveguide of an example embodiment is formed of a different material than both the first and second waveguides 30, 32 with the third waveguide of an example embodiment formed of a silicon-on-insulator (SOI) material. The relative dimensions of the tapered first region 34a and the second region 34b of constant size of the third waveguide 34 may be configured, such as based upon the material of the third waveguide, in order to efficiently receive the laser communication signals. In an example embodiment, the third waveguide 34 tapers from the end 34c to a predetermined width of not more than 120 nanometers across a length of between 250 micrometers and 500 micrometers, as measured along the longitudinal axis 38. In this regard, the third waveguide 34 of an example embodiment tapers from the end 34c to the predetermined width across a length that is between 250 micrometers and 500 micrometers as measured along the longitudinal axis 38 based on the material of the third waveguide. In an example embodiment in which the third waveguide 34 is formed of a SOI material, the third waveguide tapers from the end 34c to a predetermined width of not more than 80 nanometers across a length of at least 350 micrometers, as measured along the longitudinal axis 38.

As depicted in FIG. 5 and as described above, the first, second and third waveguides 30, 32, 34 generally decrease in lateral cross-sectional size and length from the first waveguide to the second waveguide and from the second waveguide to the third waveguide. In this regard, the length of the tapered first region 34a of the third waveguide 34 as measured along the longitudinal axis 38 is generally less than the length of the tapered first region 32a of the second waveguide 32. Similarly, the width of the second region 34b of constant size of the third waveguide 34 is generally less than the width of the second region 32b of the second waveguide 32.

Figure 6:
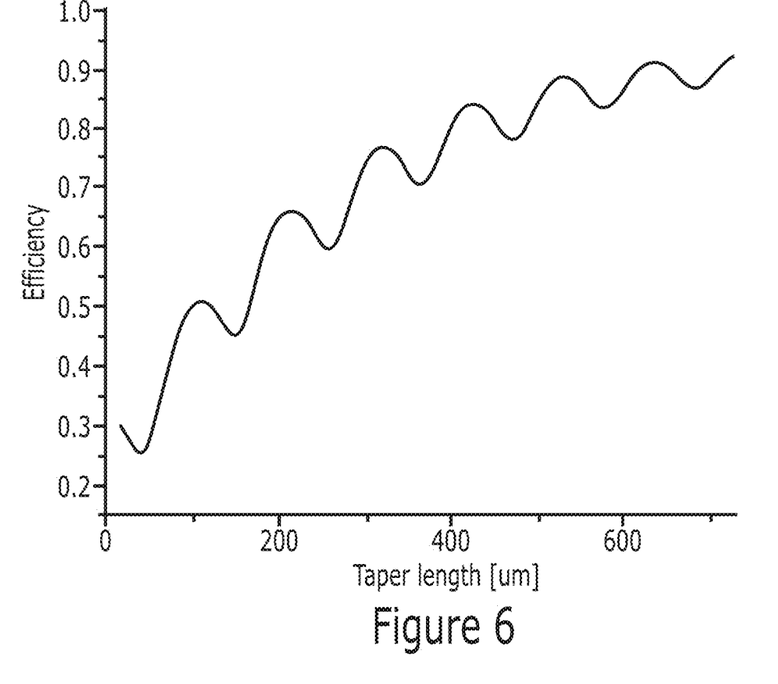
FIG. 6 is a graphical representation of the efficiency with which the input coupler operates as a function of the length of the taper of the second waveguide of the input coupler in accordance with an example embodiment.

The configuration of the first, second and third waveguides 30, 32, 34 may be designed such that the efficiency with which the signals that are received by the input coupler 20 are transmitted to the photodetectors 24 is enhanced. In particular, the length of the tapered first regions 32a, 34a of the second and third waveguide 32, 34 may impact the efficiency with which the laser communication signals are received. As shown in FIG. 6 with respect to the length of the tapered first region 32a of the second waveguide 32, the efficiency can vary from less than 0.3 for a tapered first region of the second waveguide that is relatively short as measured along the longitudinal axis 38, such as less than 100 micrometers, to an efficiency of greater than 0.9, that is, greater than 90% and, in some embodiments, to an efficiency of 91.1% for a second waveguide having a tapered first region that is longer as measured along the longitudinal axis, such as a tapered first region of at least 730 micrometers.

Figure 3:
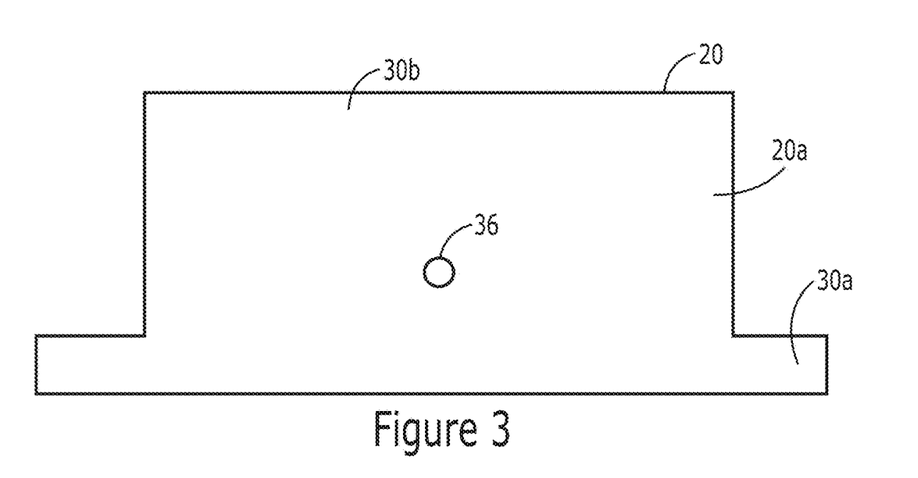
FIG. 3 is an end view of a first waveguide of an input coupler in accordance with an example embodiment.
Figure 7:
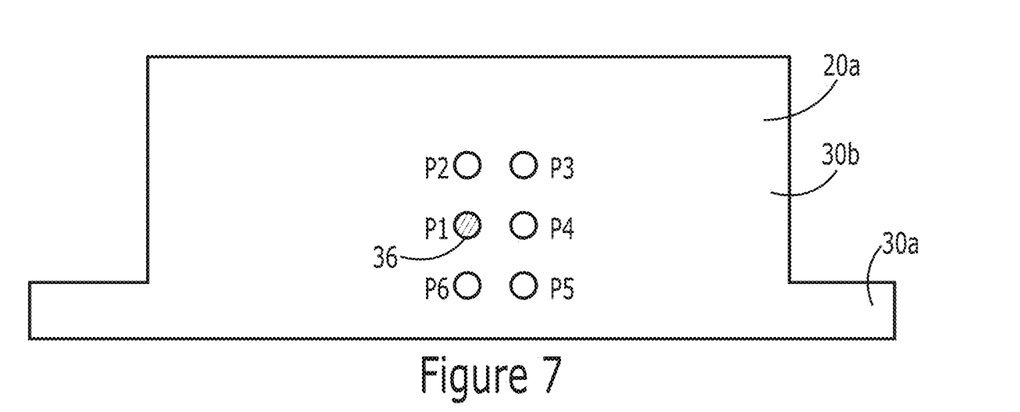
FIG. 7 represents a predefined excitation point P1 and five different points P2, P3, P4, P5 and P6 on an end face of an input coupler of an example embodiment about which a Gaussian input beam may be centered as a result of, for example, beam jitter.

The efficiency with which the laser communication signals are received as a function of the length of the tapered first region 32a of the second waveguide 32 depicted in FIG. 6 is based upon laser communication signals received at the predefined excitation point 36, such as shown in FIG. 3. However, the laser communication signals often experience some jitter relative to the laser receiver device 12. The laser receiver device 12 of an example embodiment is advantageously able to accommodate at least some jitter, such as jitter of +/−1.5 micrometers, relative to the predefined excitation point 36 while still being able to efficiently receive the laser communication signals, such as in the form of a 10 micrometer diameter Gaussian beam. In this regard, FIG. 7 depicts the predefined excitation point 36 as P1. Points P2, P3, P4, P5 and P6 represent other points on the end face of the first waveguide 30 at which a 10 micrometer diameter Gaussian beam may be centered as a result of beam jitter. In this regard, points P2 and P6 are displaced 1 micrometer up and 1 micrometer down, respectively, from the predefined excitation point 36 and points P3, P4 and P5 are displaced by 1 micrometer laterally from the predefined excitation point. The efficiency with which the laser receiver device 10 receives laser communication signals in the form of a 10 micrometer diameter Gaussian beam centered at the respective points P1, P2, P3, P4, P5 and P6 may, in one embodiment, be as follows: 91.1% at point P1, 78.8% at point P2, 71.5% at point P3, 82.7% at point P4, 73.2% at point P5, and 80.7% at point P6. Thus, while the laser receiver device 12 is most efficient in terms of receiving the laser communication signals for a Gaussian input signal centered about the predefined excitation point 36, the laser receiver device also is relatively efficient for receiving laser communication signals in the form of a Gaussian beam centered about other points proximate the predefined excitation point, but offset therefrom as a result of jitter.

As a result of the design of the input coupler 20, optical communication signals received by the input coupler are efficiently coupled to the waveguide-based tunable micro-resonator based optical filters 22. In this regard, the optical signals, which are received by the input coupler 20, may include a plurality of different optical signals that have different center frequencies and that are wavelength multiplexed together. The waveguide-based tunable micro-resonator based optical filters 22 are configured to de-multiplex the optical signals with each of the waveguide-based tunable micro-resonator based optical filters being configured to preferentially transmit optical signals having a different center frequency. The waveguide-based tunable micro-resonator based optical filters 22 are, in turn, coupled to respective one of the plurality of integrated waveguide coupled photodetectors 24, each of which is configured to detect the laser communication signals for a respective optical channel having a respective center frequency.

Thus, the input coupler 20 and, in turn, the laser receiver device 12 is configured to efficiently receive laser communication signals and to allow for at least some beam jitter, such as 1.5 micrometer beam jitter in some embodiments, while maintaining a sufficient coupling efficiency, such as a coupling efficient of greater than 73% and, more particularly, a coupling efficiency in the range of 73%-92% in some embodiments. As a result of its construction, however, the input coupler 20 and the resulting laser receiver device 12 may be smaller and lighter and may consume less power than laser receiver devices that include a mechanical nutator, fiber-optic based WDM components and discrete photodetectors. As a result, the input coupler 20 and the corresponding laser receiver device 12 correspondingly permit the size, weight and power requirements of a platform that carries the laser receiver device to be reduced, thereby facilitating airborne or space borne applications in which the platform that carries the laser receiver device is launched with the performance of the platform, in turn, being more greatly dependent upon the size, weight and power requirements of its components than terrestrial applications.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purpose of limitation.

That which is claimed is:

1. A chip-scale laser receiver device, comprising:
an input coupler that is configured to receive a gaussian beam, the input coupler including
a first waveguide having an optically-transparent material;
a second waveguide coupled to the first waveguide, the second waveguide having a tapered configuration that tapers to a predetermined width across a length of not less than 500 micrometers; and
a third waveguide coupled to the second waveguide, the third waveguide having a tapered configuration that tapers to a predetermined width across a length of not less than 250 micrometers; and
a bus optical waveguide coupled to receive a signal output from the input coupler, and to output a wavelength-multiplexed laser signal.

2. The laser receiver device of claim 1, further comprising:
a plurality of tunable micro-resonator based optical filters, each coupled to the bus optical waveguide and configured to de-multiplex the wavelength-multiplexed laser signal into multiple individual optical channels; and
one or more photodiodes respectively coupled to the individual optical channels that are output from the plurality of micro-resonator based optical filters, wherein each photodiode is configured to detect a signal level of a respective individual optical channel.

3. The laser receiver device of claim 1, wherein the second waveguide has a tapered configuration that tapers to a predetermined width of not more than 375 nanometers across a length of between 500 micrometers and 1000 micrometers.

4. The laser receiver device of claim 3, wherein the second waveguide tapers to the predetermined width across a length that is between 500 micrometers and 1000 micrometers based on the material of the second waveguide, and wherein the length is an amount at which the efficiency of the evanescent coupling of the first, second and third waveguides is at least 90 percent.

5. The laser receiver device of claim 4, wherein the second waveguide is a Silicon OxyNitride based tapered waveguide that tapers to a predetermined width of not more than 250 nanometers across a length of at least 730 micrometers.

6. The laser receiver device of claim 1, wherein the third waveguide has a tapered configuration that tapers to a predetermined width of not more than 120 nanometers across a length of between 250 micrometers and 500 micrometers.

7. The laser receiver device of claim 6, wherein the third waveguide tapers to the predetermined width across a length that is between 250 micrometers and 500 micrometers based on the material of the third waveguide, and wherein the length is an amount at which the efficiency of the evanescent coupling of the first, second and third waveguides is at least 90 percent.

8. The laser receiver device of claim 7, wherein the third waveguide is a Silicon On Insulator based tapered insulator waveguide that tapers to the predetermined width of not more than 80 nanometers across a length of at least 350 micrometers.

9. A chip-scale laser receiver device, comprising:
an input coupler that is configured to receive a gaussian beam, the input coupler including
a first waveguide having an optically-transparent material;
a second waveguide coupled to the first waveguide, the second waveguide having a tapered configuration that tapers to a predetermined width across a length of not less than 500 micrometers; and a third waveguide coupled to the second waveguide, the third waveguide having a tapered configuration that tapers to a predetermined width across a length of not less than 250 micrometers;

a plurality of tunable micro-resonator based optical filters, each configured to de-multiplex a wavelength-multiplexed laser signal into multiple individual optical channels; and one or more photodiodes respectively coupled to the individual optical channels that are output from the plurality of micro-resonator based optical filters, wherein each photodiode is configured to detect a signal level of a respective individual optical channel.

10. The laser receiver device of claim 9, further comprising a bus optical waveguide coupled to receive a signal output from the input coupler, and configured to output the wavelength-multiplexed laser signal to the plurality of tunable micro-resonator based optical filters.

11. The laser receiver device of claim 9, wherein the second waveguide tapers to the predetermined width across a length that is between 500 micrometers and 1000 micrometers based on the material of the second waveguide, and wherein the length is an amount at which the efficiency of the evanescent coupling of the first, second and third waveguides is at least 90 percent.

12. The laser receiver device of claim 11, wherein the second waveguide is a Silicon OxyNitride based tapered waveguide that tapers to a predetermined width of not more than 250 nanometers across a length of at least 730 micrometers.

13. The laser receiver device of claim 9, wherein the third waveguide is a Silicon On Insulator based tapered insulator waveguide that tapers to the predetermined width of not more than 80 nanometers across a length of at least 350 micrometers.

14. An input coupler of a chip-scale laser receiver device, comprising:

a first waveguide having an optically-transparent material;

a second waveguide coupled to the first waveguide, the second waveguide having a tapered configuration that tapers to a predetermined width across a length of not less than 500 micrometers; and a third waveguide coupled to the second waveguide, the third waveguide having a tapered configuration that tapers to a predetermined width across a length of not less than 250 micrometers.

15. The input coupler of claim 14, wherein the second waveguide has a tapered configuration that tapers to a predetermined width of not more than 375 nanometers across a length of between 500 micrometers and 1000 micrometers.

16. The input coupler of claim 15, wherein the second waveguide tapers to the predetermined width across a length that is between 500 micrometers and 1000 micrometers based on the material of the second waveguide, and wherein the length is an amount at which the efficiency of the evanescent coupling of the first, second and third waveguides is at least 90 percent.

17. The input coupler of claim 16, wherein the second waveguide is a Silicon OxyNitride based tapered waveguide that tapers to a predetermined width of not more than 250 nanometers across a length of at least 730 micrometers.

18. The input coupler of claim 14, wherein the third waveguide has a tapered configuration that tapers to a predetermined width of not more than 120 nanometers across a length of between 250 micrometers and 500 micrometers.

19. The input coupler of claim 18, wherein the third waveguide tapers to the predetermined width across a length that is between 250 micrometers and 500 micrometers based on the material of the third waveguide, and wherein the length is an amount at which the efficiency of the evanescent coupling of the first, second and third waveguides is at least 90 percent.

20. The input coupler of claim 19, wherein the third waveguide is a Silicon On Insulator based tapered insulator waveguide that tapers to the predetermined width of not more than 80 nanometers across a length of at least 350 micrometers.

* * * * *